Feb. 13, 1934.  C. R. OBERG  1,946,756
METHOD OF AND MEANS FOR CALIBRATING VALVES
Filed June 2, 1932  2 Sheets-Sheet 1

Inventor
Clifford R. Oberg.
by Roberts, Cushman and Woodbury
Attys

Feb. 13, 1934.    C. R. OBERG    1,946,756
METHOD OF AND MEANS FOR CALIBRATING VALVES
Filed June 2, 1932    2 Sheets-Sheet 2
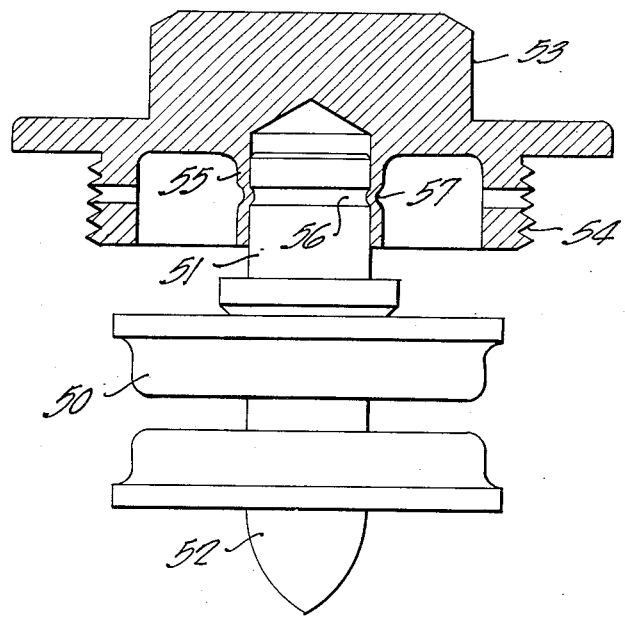
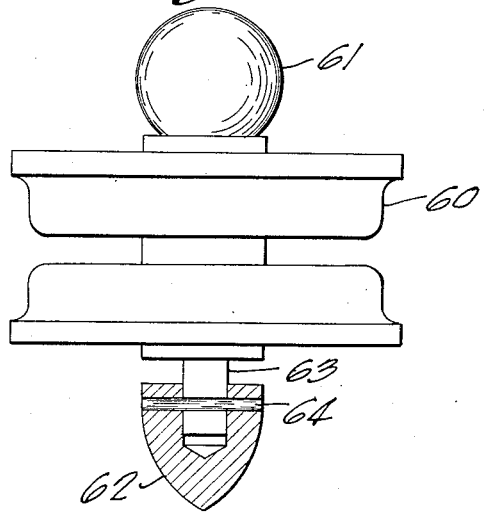
Inventor
Clifford R. Oberg
by Roberts, Cushman & Woodbury
Att'ys Patented Feb. 13, 1934

1,946,756

UNITED STATES PATENT OFFICE 1,946,756

METHOD OF AND MEANS FOR CALIBRATING VALVES

Clifford R. Oberg, Brockton, Mass., assignor to Barnes & Jones, Incorporated, Jamaica Plain, Mass., a corporation of Massachusetts Application June 2, 1932. Serial No. 614,891

26 Claims. (Cl. 29—84)

This invention pertains to automatic valves, for example, outlet valves for steam radiators or the like, and relates more particularly to a method of and means for use in calibrating such valves.

In the manufacture of valves of the above type, it has heretofore been attempted to obtain the desired relation of the parts by accurately machining them to predetermined dimensions before assembly and then assembling them with the greatest care, but such mode of manufacture is very expensive and at best uncertain of attaining the desired object in view of the many variable factors involved so that the finished valves made in accordance with previous methods are not always dependable to operate automatically under accurately predetermined conditions.

Commonly such valves employ a pressure or temperature responsive actuator (for example, an expansible-contractible metallic cell, bellows, or diaphragm) for moving the valve feather toward and from its seat, and as such valves are required to operate within a very limited and definite temperature and/or pressure range, and definitely to prevent leaking when closed, it is necessary that they be adjusted very accurately and be capable of installation without substantial probability that such accurate adjustment will be spoiled during the process of installation.

In a copending application Serial No. 611,845 filed of even date herewith, and patented May 30, 1933, No. 1,911,230 there is described a novel control unit for use in valves of the class described, such unit being adapted to be installed in a valve casing of standard type (without necessitating the use of tools in installing it), such unit comprising a cage or frame, a valve seat, a valve feather, and a valve actuator, all so constructed and arranged and so calibrated that the valve feather will engage and disengage its seat under accurately predetermined pressure or temperature conditions. The present invention is particularly useful in the manufacture of such interchangeable control units, although the method and apparatus as herein disclosed and claimed are manifestly of broader utility and applicable to the manufacture of valves of other specific character and whether or not they make use of interchangeable control units.

Thus in accordance with the present invention I may make the valve actuator, valve feather and seat of any usual construction, but without any attempt at extreme accuracy in dimensions, and assemble them in a suitable supporting structure, for instance, a cage or frame such as disclosed in the aforesaid copending application or, if desired, directly within a valve casing or part of the casing, all in accordance with the general construction of the valve which is to be made. In so assembling the actuator, valve feather and seat, I initially connect two at least of said parts, for example, the actuator and seat,—or the valve and the seat, so as to permit freedom of relative movement of such parts along the axial line of the valve seat. I then subject the parts, preferably the entire structure including the cage or frame, the valve feather, the valve seat and the actuator, to temperature or pressure conditions substantially like those under which it is desired that the valve feather operatively engage its seat to close the passage through the latter. As this predetermined condition is approached, those relatively movable parts of the composite structure, for example, the actuator and the valve seat, move relatively to some extent so as to assume the relative positions which normally correspond to the temperature or pressure conditions to which they are thus subjected.

When the predetermined conditions have been reached, the aforesaid valve parts, which have heretofore been free for relative movement, are securely fixed in the position which they have thus assumed in response to the pressure conditions. This empirical calibration of each valve under predetermined working conditions results in the greatest possible accuracy of operation when the valve is installed in the place of use, while at the same time this method avoids the necessity for careful dimensioning of the parts during manufacture, permitting manufacturing tolerances of the order of one-sixteenth of an inch for example, as compared with tolerances of a few thousandths of an inch as has heretofore been necessary. This calibration may be carried into effect simply and inexpensively as more fully explained hereinafter, and, for example, by the use of the apparatus herein described and which comprises means for permanently uniting the parts of the valve structure while they are exposed to the predetermined working conditions.

In the accompanying drawings I have illustrated certain steps in a preferred process of calibrating valve parts in accordance with the present invention, and have also shown apparatus useful in performing this process.

In the drawings,

Fig. 6 is a section, partly in elevation, illustrating the utility of the present invention in calibrating a valve actuator relatively to its support; and Fig. 7 is an elevation, partly in section, illustrating the utility of the invention in calibrating a valve feather relatively to its actuator.

Figure 4:
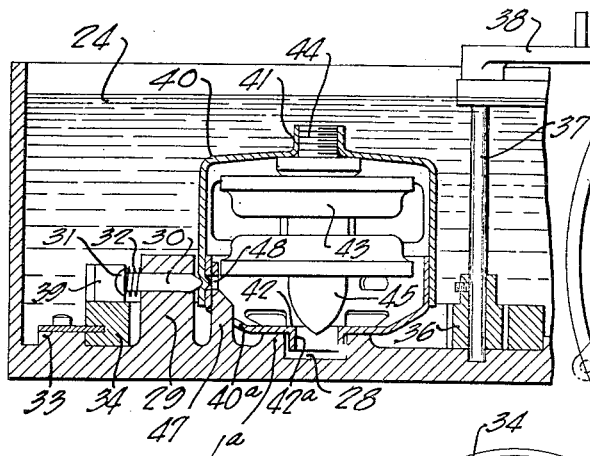
Fig. 4 is a fragmentary vertical section illustrating a modified form of apparatus and showing the valve parts at the completion of the calibrating operation.
Figure 3:
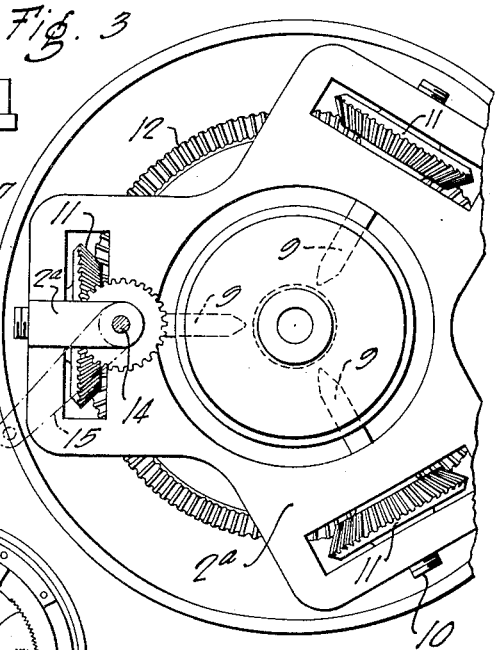
Fig. 3 is a fragmentary plan view of the apparatus shown in Fig. 1.

Referring to the drawings, which illustrate the improved method as carried out by the use of certain suggested apparatus useful for the purpose, the numeral 1 designates a support upon which the assembled valve parts are conveniently mounted during the calibrating operation. As shown, this support is a disk-like substantially horizontal table having an upstanding rim 2 and a central downwardly directed hub 3 terminating in a screw-threaded portion 4 which engages a screw-threaded socket in a boss 5 forming part of a base member 6, which in this instance is illustrated as constituting the bottom of a fluid tight receptacle 7. The rim 2 of the support is provided at suitable intervals with bosses 8 providing guideways in which indenting devices 9, here shown as pins, are arranged to slide, the several devices 9 being disposed in substantially the same horizontal plane, and being arranged symmetrically with respect to the axis of the hub 3. The indenting devices 9 are preferably furnished with more or less sharp inner or operative ends and are preferably prevented from turning in their guideways by suitable means, for example a spline or equivalent means. At their outer ends the indenting devices are furnished with screw-threaded portions 10 which receive internally screw-threaded pinions 11 interposed between the outer surface of the rim 2 and the inner surface of a bracket device 2ᵃ. The pinions 11 mesh with a large gear 12 having a hub 13 which is mounted to rotate on the boss 3 of the support. The gear 12 is turned by means of a vertical shaft 14 journalled to turn in the bracket 2ᵃ and in another bracket 2ᵇ secured to the side wall of the receptacle. At its upper end the shaft 14 is provided with a handle 15, and at its lower end is furnished with a pinion 16 meshing with one of the pinions 11.

Figure 1:
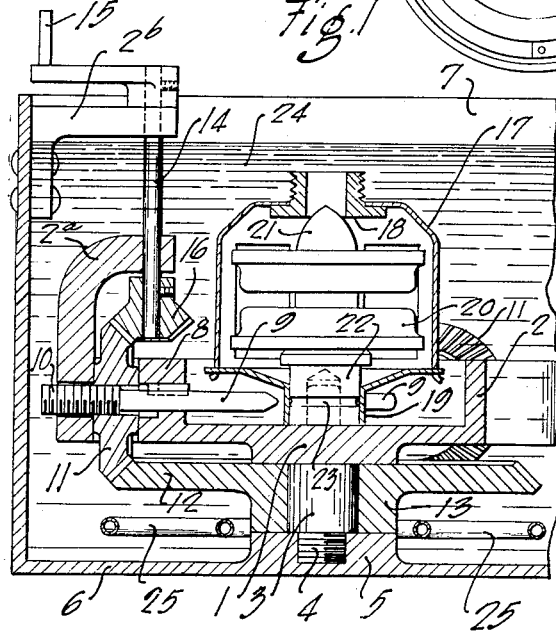
Fig. 1 is a fragmentary vertical section illustrating one form of apparatus for use in securing the valve parts together when properly adjusted, the parts being shown in the position which they occupy at the beginning of the calibrating operation.
Figure 2:
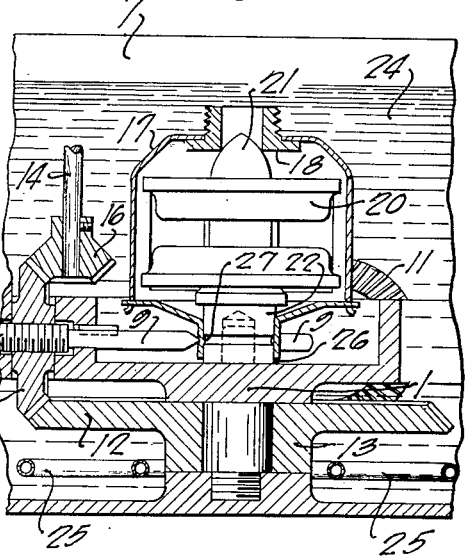
Fig. 2 is a fragmentary view similar to Fig. 1, but showing the parts at the completion of the calibrating operation and with the valve members secured in fixed relation.

As shown in Fig. 1 the apparatus is arranged for calibrating assembled valve parts comprising a cage or enclosing structure 17, such as disclosed in the aforesaid copending application, having a valve seat 18 at one end and a sleeve member 19 at its other end. This cage 17 encloses a valve actuator 20 having a valve feather 21 at one end adapted at times to engage the seat 18, and having a stem 22 at its other end disposed telescopically within the sleeve 19. When the parts are first assembled, the stem 22 is free to move axially in said sleeve. As shown, the stem 22 is furnished with a peripheral groove 23, and this groove is at such a distance from the end of the stem that when the latter rests upon the support 1, as shown in Fig. 1, this groove will lie in the plane of movement of the indenting devices 9.

The assembled valve parts are mounted on the support 1, as shown in Fig. 1, and the actuator 20 is then subjected to a predetermined temperature, as for example by exposing it to a heated fluid 24 in the receptacle, such fluid may conveniently be kept at the desired temperature by means of heating coils 25 in the receptacle.

As the assembled valve parts are raised in the predetermined working temperature at which the valve feather 21 normally should come into engagement with its seat 18, the actuator device 20 begins to expand, thereby lifting the valve feather 21 into contact with its seat 18. As the actuator then continues to expand in response to increasing temperature, the sleeve 19 will rise relatively to the stem 22 until the parts reach a stable condition, that is to say, until the actuator ceases to expand when it has reached the predetermined selected temperature. While the temperature is now maintained the handle 15 is rotated, thereby turning the gear 12 and simultaneously advancing the converging indenting devices 9 until their pointed ends engage the material of the sleeve 19 and deform or indent the material, as permitted by the groove 23, so as to form indentations projecting into the groove 23 of the stem. In this manner the stem and sleeve are permanently fixed in the position which they have automatically assumed in direct response to the predetermined temperature, and the valve is thus accurately calibrated empirically.

Since the actuator 20 responds quite rapidly to temperature change, it is possible to calibrate a very large number of valve devices in a given period, since the indenting operation may be performed very quickly, and as soon as it is completed the gear 12 may be reversed to retract the indenting devices, permitting the completed valve device to be withdrawn from the receptacle and another to be inserted. When the valve structure has thus been calibrated and its parts fixed, no further adjustment is required or is possible, so that when the unit thus calibrated is installed in a valve casing it is assured that it will operate accurately at the predetermined temperature until it is worn out in service.

Figure 5:
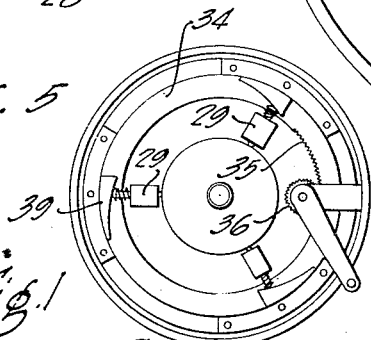
Fig. 5 is a plan view, to small scale, of the apparatus shown in Fig. 4.

In the arrangements shown in Figs. 4 and 5 the apparatus is designed for calibrating a valve unit of somewhat different type, and in this arrangement the support 1ᵃ consists of an annular rib projecting upwardly from the bottom of the receptacle, leaving the central recess or chamber 28 for the reception of a portion of the valve structure. Concentric with this annular rib 1ᵃ I arrange a plurality of upwardly projecting lugs or brackets 29, each furnished with a horizontal guideway for a sliding indenting pin 30. Preferably each of these pins has a rounded outer end or head 31, and a spring 32 interposed between this head and the bracket 29 tends to move the pin outwardly. These pins 30 are arranged symmetrically with respect to the axis of the support 1ᵃ and are furnished with pointed inner ends in the same way as the pins 9 above described.

Within suitable guiding members 33 on the bottom of the receptacle I arrange an annulus 34 provided with internal gear teeth 35 meshing with a pinion 36 on the lower end of a shaft 37 having an actuating handle 38 at its upper end. The annulus 34 carries cams 39 adapted to engage the heads 31 of the indenting devices 30, and upon rotation of the annulus to advance the indenting devices simultaneously for indenting the valve parts.

As shown in Fig. 4, the assembled valve parts include a cage or enclosing structure comprising the upper part 40 provided with the sleeve member 41, and the lower part 40ª furnished with the valve seat portion 42, and the downwardly extending centering boss 42ª which, as shown, is disposed in the cavity 28. The parts 40 and 40ª of this cage are of cylindrical form and originally telescope one within the other. The actuator 43 is disposed within this cage and has a stem 44 which is fixedly secured to the sleeve 41, for example, by screw-threaded engagement therewith. The actuator 43 also carries the valve feather 45 adapted to cooperate with the seat 42.

The assembled valve parts are disposed as shown in Fig. 4, with the lower part 40ª of the cage resting on the support 1ª and with the valve feather 45 resting upon the seat 42. When the actuator is subjected to the predetermined working temperature and expands in response thereto, it lifts the upper part 40 of the cage with respect to the lower part 40ª, and this relative movement continues until the actuator ceases to expand, thereupon the handle 38 is turned so as to revolve the annulus 34 and advance the indenting devices 30 so as to indent the overlapping material of the telescoping portions of the parts 40 and 40ª of the cage. Preferably, in order to facilitate this indenting operation, I provide an abutment member 47 directly opposite to each of the indenting devices 30, and furnish this abutment member with a recess 48, thereby to permit the material of the inner telescopic member to be pressed inwardly by the indenting device, this forming a secure and permanent lock between the parts of the cage.

After calibration in this manner, the assembled parts may be removed from the receptacle and another set of parts inserted for calibration, the operation being accurate and rapid and independent of any accurate machining of the valve elements, since the final positioning of the valve elements is automatic and in direct response to the expansion of the actuator according to the predetermined temperature.

Under some circumstances this novel method of calibration may find utility in other specific applications than that previously described. Thus, for example, it may be desirable to calibrate the actuator relatively to its support, for instance, the cover of the valve casing. Thus, as indicated in Fig. 6, the actuator 50 is provided at one end with the stem 51 and at the other with the valve feather 52. The cover 53 of the valve casing is provided at its rim with screw threads 54 for engagement with screw threads on the wall of the casing, proper (not shown). The casing is provided with a depending sleeve 55 into which the stem 51 may be telescoped. The stem 51 is provided with an annular groove 56 and, after assembly of the stem within the sleeve 55, the actuator (and preferably the other parts) is subjected to a predetermined pressure or temperature condition and, while this condition is maintained, the sleeve 55 is indented into the groove 56 of the stem, as indicated at 57, thus permanently securing the actuator and cover in calibrated relation.

In Fig. 7 the actuator 60 has the stem 61 which may, for example, as in the patent to Jones 1,738,248, dated December 3, 1929, be received in a spring socket in the cover of the valve casing (not shown). At its opposite end, the actuator carries the valve feather 62 which, in this instance, is provided with an axial socket for the reception of a stud 63 projecting from the lower end of the actuator. After the parts are assembled they are subjected to the proper temperature or pressure conditions, and while these conditions are maintained, a hole may be drilled through the feather 62 and the stud 63 and a pin 64 inserted in this hole so as to lock the feather and actuator in fixed relatively calibrated relation.

Obviously more than two of the constituent parts of the valve may be assembled and fixedly secured in position while under calibrating conditions in a manner similar to that hereinabove described, and while I have herein disclosed certain desirable specific forms of apparatus for carrying the invention into effect, I contemplate that other specific means may be provided within the scope of the invention.

I claim:

1. That method of making calibrated automatic trap valves, which comprises preparing a valve seat, a valve feather, and an actuator, assembling said parts in axial alignment and in proper relative order but so as to allow two at least of said parts freedom of relative motion in an axial direction, calibrating the assembled valve by subjecting the parts to predetermined operating conditions, and, while maintaining said conditions, fixedly uniting those parts which initially were allowed freedom of relative motion.

2. That method of making calibrated automatic trap valves, which comprises as steps assembling a plurality of cooperating valve parts including an actuator, a valve seat and a valve feather, certain of said parts being free to move relatively to each other, calibrating the assembled valve by subjecting said parts to a predetermined working temperature until the actuator has expanded to an amount corresponding to such temperature and ceases to expand further, and, while maintaining such temperature, permanently uniting certain of said parts in the relative positions to which they have been moved by expansion of the actuator.

3. That method of making calibrated automatic valves of the class described, which comprises preparing a valve seat, a valve feather and a valve actuator, assembling said parts in accordance with the general arrangement which they occupy in the completed valve but leaving the actuator free for bodily movement in an axial direction relatively to the valve seat, calibrating the assembled valve by subjecting the actuator to temperature conditions corresponding to those at which the completed valve is intended to close, and while maintaining such temperature conditions fixedly securing the actuator and valve seat in the relative positions which they have assumed in response to such temperature conditions.

4. That method of making calibrated automatic valves of the class described, which comprises as steps preparing a valve seat, a valve feather, a valve actuator, and a cage structure, securing the valve seat to the cage, assembling the valve feather and actuator within the cage, the actuator being arranged for bodily relative movement with reference to the cage, calibrating the assembled valve by subjecting the parts to predetermined working conditions, and while maintaining such conditions fixing the actuator to the cage member.

5. That method of making calibrated automatic valves of the class described, which comprises as steps preparing a valve seat, a valve feather and a valve actuator, assembling said parts substantially in the relative arrangement which they will occupy in the completed valve structure but in such a way that the valve actuator may move bodily in an axial direction relative to the seat, calibrating the assembled valve by exposing the actuator to the temperature at which it is desired that the valve close when in use, and permanently fixing the actuator with reference to the seat while maintaining such temperature.

6. That method of making calibrated automatic valves of the class described, which comprises as steps preparing an enclosing structure having a valve seat fixed therein, preparing a valve feather and a valve actuator, uniting the valve feather and actuator and disposing them within the enclosing structure, arranging the actuator to slide relatively to the enclosing structure, calibrating the assembled valve by subjecting the parts to a predetermined temperature, and, while maintaining the parts at such temperature, permanently uniting the actuator and the enclosing structure to prevent further relative sliding movement thereof.

7. That method of making calibrated automatic valves of the class described, which comprises as steps preparing an enclosing structure having a valve seat fixed therein, preparing a valve feather and a valve actuator, connecting the actuator to the supporting structure so as to permit a part of one to slide telescopically within a part of the other calibrating the assembled valve by subjecting the actuator to a predetermined working temperature, and while maintaining such temperature uniting said previously slidable parts to prevent further relative movement thereof.

8. That method of making calibrated automatic valves of the class described, which comprises as steps preparing an enclosing structure having a valve seat fixed therein, preparing an actuator having a valve feather secured thereto, connecting the actuator to the supporting structure so as to permit a part of one to slide telescopically within a part of the other calibrating the assembled valve by subjecting the actuator to a predetermined working temperature, and while maintaining such temperature indenting one of said telescoping parts to fix it permanently to the other part.

9. That method of making calibrated automatic valves of the class described, which comprises as steps preparing an enclosing structure having a valve seat fixed therein, preparing an actuator having a valve feather secured thereto, connecting the actuator to the supporting structure so as to permit a part of one to slide telescopically within a part of the other, one of said telescopic parts having a depression in its surface, calibrating the assembled valve by subjecting the actuator to a predetermined working temperature, and while maintaining such temperature causing a part of the second telescopic member to enter the depression in the first, thereby permanently to lock them against further sliding movement.

10. That method of making calibrated valves of the class described comprising as steps preparing an enclosing structure having a valve seat fixed therein, preparing a valve feather, preparing a valve actuator having a supporting stem at one end, securing the valve feather to the other end of the actuator, assembling the parts with the stem of the actuator disposed to telescope within a part of the supporting structure, calibrating the assembled valve by subjecting the parts to a predetermined working temperature, and, while maintaining said temperature, fixing said actuator stem to that part of the supporting structure in which it telescopes.

11. That method of making calibrated valves of the class described comprising as steps preparing an enclosing structure having a valve seat fixed at one end, and a tubular member coaxial with the valve seat at its opposite end, preparing a valve feather, preparing an actuator having a stem at one end, the stem having a peripheral groove, securing the valve feather to the other end of the actuator, inserting the stem of the actuator in the tubular member of the enclosing structure, calibrating the assembled valve by subjecting the actuator to a predetermined working temperature, and while maintaining such temperature indenting said tubular member into the groove in the stem.

12. That method of making calibrated valves of the class described comprising as steps preparing a cage having a valve seat fixed at one end and a tubular member at its opposite end, preparing a valve actuator carrying a valve feather at one end and having a peripheral grooved stem at the other end, inserting the stem of the actuator into the tubular member of the cage, arranging the cage so that its tubular member rests upon a suitable support, the actuator stem also resting upon said support with the valve spaced from the valve seat, calibrating the assembled valve by exposing the actuator to a predetermined working temperature until the valve engages the seat, and, while maintaining such temperature, indenting the tubular member into the groove in the stem, thereby permanently uniting the stem and cage.

13. That method of making calibrated valves of the class described comprising as steps preparing a cage having a valve seat fixed at one end and a tubular member at its opposite end, preparing a valve actuator carrying a valve feather at one end and having a peripherally grooved stem at the other, inserting the stem of the actuator into the tubular member of the cage, disposing the assembled structure in inverted position with the ends of the stem and tubular member resting upon a suitable support, calibrating the assembled valve by exposing the actuator to a predetermined working temperature, thereby to cause the actuator to move the valve feather into contact with the seat and to move the stem relatively to the tubular member until the actuator ceases to expand, and, while maintaining the temperature substantially constant, indenting the tubular member into the groove in the stem thereby permanently to unite the stem and cage.

14. That method of making calibrated valves of the class described comprising as steps preparing a cage comprising relatively movable upper and lower portions, the lower portion having a fixed valve seat and the upper part having attaching means, preparing an actuator having a valve feather at its lower end and a stem at its upper end, securing said stem to the attaching means of the upper cage portion, assembling the upper and lower portions of the cage, disposing the lower portion of the cage upon a suitable support, calibrating the assembled valve by exposing the actuator to a predetermined working temperature until relative movement of the upper and lower portions of the cage ceases, and, while maintaining such temperature, permanently uniting the upper and lower portions of the cage.

15. That method of making calibrated valves of the class described comprising as steps preparing a cage having upper and lower telescopic cylindrical portions, the lower portion having a fixed valve seat and the upper portion having attaching means, preparing an actuator having a valve feather at one end, securing the other end of the actuator to the attaching means of the upper cage portion, assembling the upper and lower cage portions, disposing the lower portion of the cage upon a suitable support, calibrating the assembled valve by exposing the actuator to a predetermined working temperature until relative movement of the upper and lower portions of the cage ceases, and, while maintaining such temperature, indenting the overlapping parts of the upper and lower portions of the cage so as permanently to unite them in relatively fixed position.

16. That method of empirically calibrating thermostatic trap valves which comprises as steps preparing a plurality of valve parts, one of said parts being an actuator, assembling said parts so that at least one of said parts is movable relatively to the actuator, calibrating the assembled valve by subjecting said parts to a substantially unvarying predetermined pressure and, while maintaining such pressure, permanently uniting the parts in fixed relative relation.

17. Apparatus for use in calibrating a valve comprising an assemblage of elements, which, when initially assembled, include a pair of relatively movable engaging parts, said apparatus comprising a support for the assembled valve elements, means for subjecting said valve elements while so supported to a substantially unvarying predetermined temperature, and means for permanently uniting said previously movable engaging parts while the assembled elements are kept at said predetermined temperature.

18. Valve calibrating apparatus of the class described comprising a plurality of indenting devices movable in paths converging toward a central point, means for supporting assembled valve parts at said central point for engagement by said devices as they are caused to approach each other, means for simultaneously advancing said indenting devices, and means for maintaining the assembled valve parts to be operated upon by said indenting devices at a substantially constant, predetermined temperature during the indenting operation.

19. Apparatus for use in calibrating valves of the class described, said apparatus comprising a receptacle adapted to receive assembled valve elements comprising a pair of normally telescopic relatively movable parts, means within the receptacle constituting a support for one of said relatively movable parts, means within the receptacle for maintaining a substantially unvarying predetermined temperature therein, and mechanical parts operative, while the assembled valve elements are kept at said temperature, to deform the material of at least one of said telescopic parts, thereby fixedly to unite said parts.

20. Apparatus for use in calibrating valves of the class described, said apparatus comprising a receptacle adapted to receive assembled valve elements comprising a pair of telescopic relatively movable parts, means within the receptacle for supporting one of said relatively movable parts, a body of heated fluid within the receptacle adapted to maintain said assembled elements at a predetermined, substantially constant temperature, a plurality of indenting devices, and means operative simultaneously to advance said indenting devices into contact with one of said telescopic parts by deforming said part, thereby to fix it to the other telescopic part.

21. Apparatus for use in calibrating valves of the class described, said apparatus comprising a receptacle adapted to receive assembled valve elements comprising a pair of telescopic relatively movable parts, means within the receptacle for supporting one of said relatively movable parts, a body of heated fluid within the receptacle adapted to maintain said assembled elements at a predetermined, substantially constant temperature, a plurality of indenting devices disposed symmetrically about the assembled valve elements, each of said devices having a sharp operating end, and means for simultaneously advancing said devices at substantially the same rate whereby to cause their sharp ends to engage and indent the material of the outer of the telescopic parts, thereby to fix said parts in relative position.

22. Apparatus for use in calibrating valves of the class described, said apparatus comprising a receptacle adapted to receive assembled valve elements comprising a pair of telescopic relatively movable parts, means within the receptacle for supporting one of said relatively movable parts, a body of heated fluid within the receptacle adapted to maintain said assembled elements at a predetermined, substantially constant temperature, a plurality of indenting devices, said indenting devices being disposed exteriorly of said telescopic parts, a recessed abutment opposed to each indenting device and disposed interiorly of the telescopic parts, and means for simultaneously advancing the several indenting devices into engagement with the outer of the telescopic members whereby to indent the material of both members, thereby to lock them in fixed relative position.

23. Apparatus for use in calibrating assembled, valve elements including a member having a valve seat at one end and a sleeve at its other end and an actuator provided with a valve feather at one end and a stem at the other, the stem of the actuator being arranged to slide in the sleeve of the seat carrying member, said apparatus comprising a support for the sleeve and stem, a plurality of indenting devices movable inwardly into contact with said sleeve, means for simultaneously moving said indenting devices inwardly whereby to indent the material of the sleeve and thereby lock the stem to the sleeve, and means for maintaining the assembled valve elements at a substantially constant predetermined temperature while the indenting devices are being actuated.

24. Apparatus for use in calibrating assembled valve elements including a member having a valve seat at one end and a sleeve at its other end, and an actuator provided with a valve feather at one end and a stem at the other, the stem of the actuator fitting loosely in the sleeve of the seat carrying member, one of said parts having a peripheral groove, said apparatus comprising a support for the sleeve and stem, a plurality of indenting pins arranged to slide in converging paths and in a substantially horizontal plane spaced from the support a distance substantially equal to the distance of the groove from the end of the part in which it is formed, means for simultaneously moving said pins inwardly whereby to indent the material of the sleeve into the groove of the stem, thereby permanently to unite the stem and sleeve, and means for subjecting the actuator to a predetermined substantially constant temperature while the indenting devices are being operated.

25. Valve calibrating apparatus of the class described comprising a plurality of indenting devices, means for guiding said devices to move in converging paths in substantially the same plane, means for supporting assembled valve parts in position to be engaged by said indenting devices as the latter advance, means for maintaining the assembled valve parts at substantially constant, predetermined temperature, a gear concentric with the support for the valve parts, and means actuated by said gear for simultaneously moving the indenting devices into operative position.

26. Valve calibrating apparatus of the class described comprising a plurality of indenting devices, means for guiding said devices to move in converging paths in substantially the same plane, means for supporting assembled valve parts in position to be engaged by said indenting devices as the latter advance, means for maintaining the assembled valve parts at substantially constant, predetermined temperature, a gear member concentric with the support for the valve parts, means for turning the gear, and an internally screw-threaded pinion engaging a threaded portion of each of the indenting devices, said pinions engaging the gear whereby as the gear is turned the several indenting devices are simultaneously advanced toward operative position.

CLIFFORD R. OBERG.